United States Patent Office 2,839,027
Patented June 17, 1958

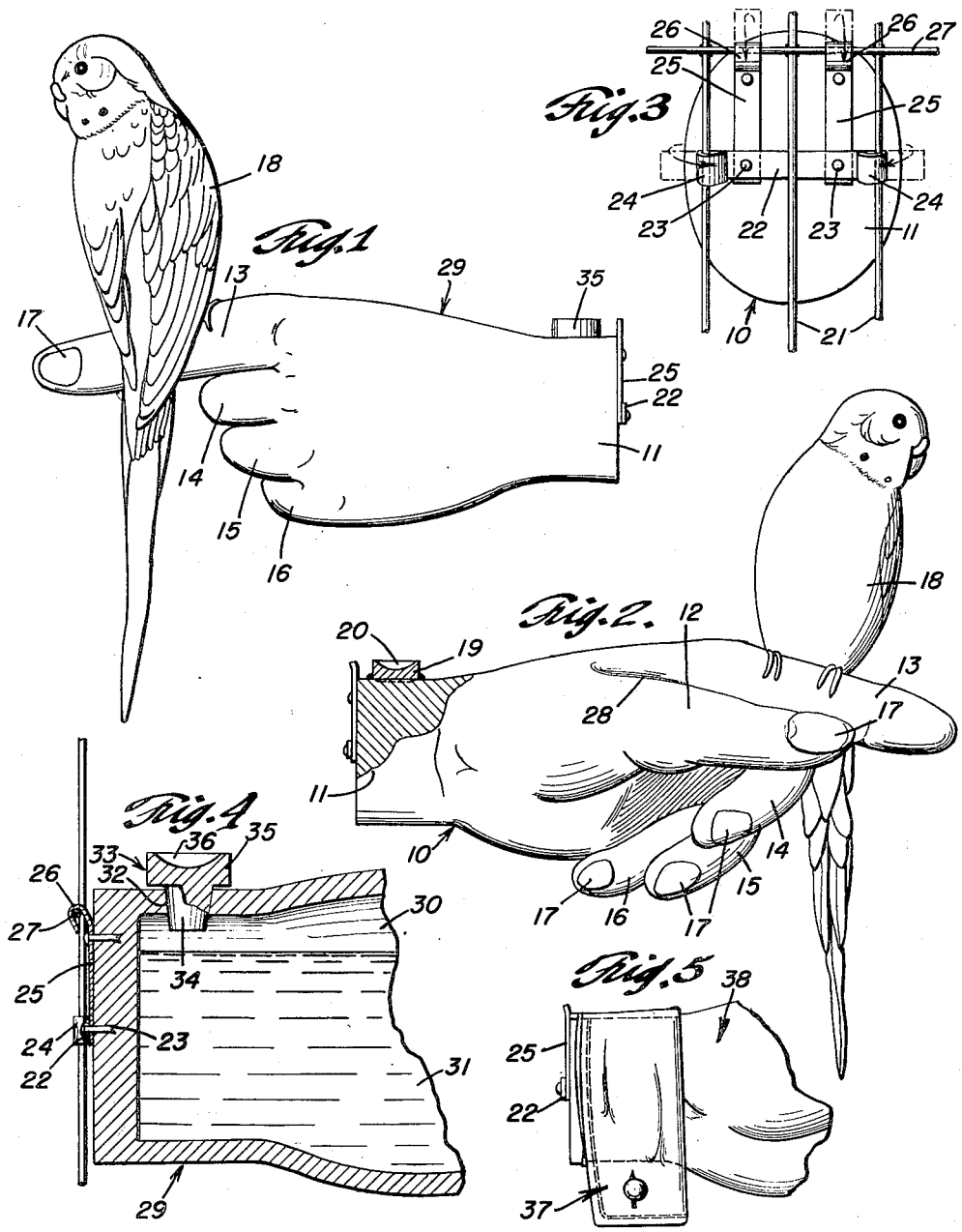
June 17, 1958   P. LANZA   2,839,027
ACCESSORY FOR USE WITH BIRDS
Filed Sept. 28, 1956
INVENTOR.
Peter Lanza
BY Victor J. Evans & Co.
ATTORNEYS

2,839,027

ACCESSORY FOR USE WITH BIRDS

Peter Lanza, Newark, N. J.

Application September 28, 1956, Serial No. 612,803

4 Claims. (Cl. 119—26)

This invention relates to pet birds or other animals or creatures, and more particularly to a device for use in training birds or the like.

The object of this invention is to provide an accessory for use in training birds or the like which is in the form or nature of a member which simulates a person's hand so that the birds will become accustomed to the person's hand.

Another object of the invention is to provide a training device for use with birds or the like which includes a body member that has the configuration of a human hand whereby the device can be mounted in a bird cage or the like so that the bird will use the hand simulating member as a perch whereby the bird will become accustomed to the person's hand so as to facilitate the job of training the bird to sit on the hand.

A further object of the invention is to provide a bird training device which is extremely simple and inexpensive to manufacture.

Other objects and advantages will be apparent during the course of the following description.

In the accompanying drawing, forming a part of this application, and which like numerals are used to designate like parts throughout the same.

Figure 1 is an elevational view showing the bird training device of the present invention.

Figure 2 is a view looking at the other side of the device from Figure 1 and with parts broken away and in section to illustrate a modification of the invention.

Figure 3 is an end elevational view of the member shown in Figures 1 and 2.

Figure 4 is an enlarged fragmentary sectional view illustrating more clearly the device of Fig. 1.

Figure 5 is a fragmentary elevational view illustrating a further modification.

Referring in detail to the drawing, the numeral 10 designates a body member which has the shape or configuration of a person's hand, and the body member 10 may include a wrist portion 11 which has a plurality of fingers 12, 13, 14, 15 and 16 extending therefrom, Figures 1 and 2. The fingers may be provided with finger nail simulating portions 17 thereon, and the numeral 18 designates a parakeet or other bird which is adapted to use the accessory of the present invention.

Referring more in detail to Fig. 2, wherein one form of the invention is shown, there is mounted on the wrist portion 11 of the body member 10 and secured thereto in any suitable manner, for example by means of adhesive, a cup 19 which is provided with a recess 20 whereby feed or bird seed or the like can be arranged in the recess 20.

There is further provided a means for detachably connecting the body member 10 to a suitable supporting structure such as a portion of a bird cage. This supporting means comprises horizontal strips 22 which may be secured to an end of the body member 10 in any suitable manner, as for example by means of suitable securing elements 23. Portions of the strip 22 are adapted to be bent or folded over as 24 so that they engage bars 21 of a bird cage or the like. There is further provided vertical strips 25 which are adapted to have portions 26 folded or bent over into engagement with other bars 27 of the bird cage, Figure 3. In Figure 3 the arrows indicate how the strips are bent.

As shown in Figure 2, there is formed between the thumb 12 and forefinger 13, a recess or cavity 28 which can be used for holding a quantity of bird seed or the like.

Referring to Figures 2 and 4 of the drawing, there is shown a body member that is indicated generally by the numeral 29, and the body member 29 is provided with a hollow interior which defines a reservoir or chamber 30 for holding a quantity of fluid such as warm water 31. The body member 29 is provided with a filling opening 32, and a plug 33 is detachably mounted in the opening 32. The plug 33 includes a tapered shank 34 which has an enlarged head 35 on the end thereof, and the head 35 is provided with a recess 36 which can be used as a holder for bird seed or the like.

Referring to Figure 5 of the drawing, there is shown a further modification wherein the numeral 37 designates a portion of a cuff which can be mounted on the wrist portion of the body member so as to increase the realistic appearance of the device. In Figure 5 the body member is indicated generally by the numeral 38.

From the foregoing, it is apparent that there has been provided a device which will facilitate the training of birds such as parakeets, canaries or the like. In use, it will be seen that there has been provided a member such as the member 10 or 29 which has the same shape as a person's hand and this member is adapted to be positioned within a bird cage or the like so that a bird such as the bird 18 will grow accustomed to perching on the hand or on a finger such as the finger 13. Thus, after the bird 18 becomes accustomed to perching on the hand simulating member, this member can be removed so that the bird will have no fear of perching on a natural hand of a person.

The body members 10 and 29 may be made of a material which simulates the texture of skin of a person's hand so as to make the device more realistic. Furthermore, the members can be readily attached to a suitable supporting structure such as the bars 21 and 27 of a bird cage, by means of the folded portions 24 and 26 of the strips 22 and 25 as shown in Figures 3 and 4. The cup 19 can be used for holding bird seed. In Figure 4, the inner chamber 30 may be filled with warm water 31 so that the member 29 will have a temperature which simulates the normal temperature of a person's hand. In Figure 4, as previously described, the opening 32 can be used as a means for filling the chamber 30 with the water 31, and the plug 33 can be used for closing the opening 32. The plug 33 is provided with a recess 36 which serves as a holder for bird seed or the like. In Figure 5 there is shown a further modification wherein a portion of a cuff 37 can be mounted on the member 38 so as to help increase the realistic appearance of the device.

With the present invention, the owner of a bird can go shopping, do housework, watch television or perform any other duties while the hand simulating body member is simultaneously training the bird. Furthermore, the member will continue to tame the bird continuously and by using the member of the present invention to tame the bird, there will be no possibility of getting the fingers or and bitten by the bird.

The device can be attached to any part of the home. After the bird has become accustomed to the hand simulating member of the present invention, the device can be attached to any suitable supporting member, such as a window, article of furniture or the like or any other location where it is desired to have the bird perch. The device will cause the bird to be accustomed to either a man's or women's hand or a child's hand or all of these. After the device is no longer needed for taming or teaching the bird, it can be used as a toy, as for example, it can be used for a toy by a dog or a cat.

The member can be made of any suitable material and in any shape and size but is preferably made so that it has the same approximate size as a human hand. The member may be made of plastic, rubber or other material which feels and looks like a human hand. By means of the present invention parakeets and other birds can be more easily and quickly finger-tamed.

In using the device, all of the perches inside of the cage may be removed and the member of the present invention is attached to the inside of the cage, as for example by means of the strips 22 and 25. The bird will then be compelled or forced to perch on the finger-tamer of the present invention and in due time the bird will become accustomed to the present invention so that the bird will lose its fear of the human hand and will then become finger-tamed so that it will perch on the human hand at will.

As shown in Figure 4, the member can be hollow so that warm water 31 can be inserted therein so as to give the warm impression of a real human hand. If desired, the plug 33 may have a threaded fitting with the body member 29. Also, if desired, a suitable layer of material can be arranged on the outer surface of the body member so as to further make the member have the appearance and texture of a human hand. Also, the finger nail areas or impressions 17 may be provided with nail polish so as to resemble a female human hand. This polish can be removed when desired. Also, the grooves 28 between the fingers 12 and 13 can be used to hold some bird seed so as to help encourage the bird to perch. As shown in Figure 5, a portion of a sleeve or cuff 37 can be mounted on the wrist portion of the body member 38. The cuff 37 can be cut from old articles of clothing such as sweaters, blouses or the like, and the cuff 37 will further increase the realistic appearance of the device.

What is claimed is:

1. In a bird training accessory, a body member having the configuration of a person's hand and shaped to include a wrist portion and a plurality of fingers, and means for releasably attaching the body member to a supporting structure, said means comprising vertically disposed strips and a horizontally disposed strip secured to an end of said body member, said strips adapted to have portions thereof arranged in engagement with the supporting structure.

2. In a bird training accessory, a body member having the configuration of a person's hand and shaped to include a wrist portion and a plurality of fingers, and means for attaching the body member to a supporting structure, said means comprising vertically disposed strips and a horizontally disposed strip secured to an end of said body member, said strips adapted to have portions thereof arranged in engagement with the supporting structure, a cup secured to said wrist portion and provided with a recess for holding feed, there being a groove between certain of said fingers for holding feed.

3. In a bird training accessory, a body member having the configuration of a person's hand and shaped to include a wrist portion and a plurality of fingers, and means for attaching said body member to a supporting structure, said body member being hollow so as to define an inner chamber for holding a quantity of warm fluid, there being a filling opening in said body member, a plug having a tapered shank positioned in said filling opening, said plug further including an enlarged head provided with a recess for holding feed, the means for attaching the body member to a supporting structure including vertically disposed strips and a horizontally disposed strip secured to an end of said body member and said strips adapted to have portions thereof arranged in engagement with the supporting structure.

4. A bird training accessory for training a bird to perch on a natural hand of a person, comprising a body member having the configuration of a person's hand and shaped to include a wrist portion and a plurality of fingers, said fingers being provided with fingernail simulating portions, means for releasably attaching the body member to a supporting structure, a cup secured to said wrist portion and provided with a recess for holding feed, there being a groove between certain of said fingers for holding feed, said accessory being made of a material which feels and looks like a human hand.

References Cited in the file of this patent

UNITED STATES PATENTS

| | | |
|---|---|---|
| 340,116 | Hinman | Apr. 20, 1886 |
| 1,625,317 | Hodgson | Apr. 19, 1927 |
| 2,464,577 | Hobbs | Mar. 15, 1949 |